US010693642B1

(12) United States Patent
Saxton et al.

(10) Patent No.: US 10,693,642 B1
(45) Date of Patent: Jun. 23, 2020

(54) OUTPUT SWITCHING FOR ENCODED CONTENT STREAMS

(71) Applicant: Amazon Technologies, Inc., Seattle, WA (US)

(72) Inventors: John Robert Saxton, Portland, OR (US); Olaf Nielsen, Portland, OR (US); Evan Gerald Statton, Denver, CO (US)

(73) Assignee: Amazon Technologies, Inc., Seattle, WA (US)

( * ) Notice: Subject to any disclaimer, the term of this patent is extended or adjusted under 35 U.S.C. 154(b) by 153 days.

(21) Appl. No.: 15/614,345

(22) Filed: Jun. 5, 2017

(51) Int. Cl.
*H04L 9/12* (2006.01)
*H04L 9/06* (2006.01)
*H04N 21/2347* (2011.01)

(52) U.S. Cl.
CPC ............. *H04L 9/12* (2013.01); *H04L 9/065* (2013.01); *H04L 9/0631* (2013.01); *H04N 21/2347* (2013.01)

(58) Field of Classification Search
CPC ......... H04L 9/12; H04L 9/065; H04L 9/0631; H04N 21/2347
USPC .......................................................... 380/42
See application file for complete search history.

(56) References Cited

U.S. PATENT DOCUMENTS

| 2006/0031892 A1* | 2/2006 | Cohen ................ H04N 7/17318 725/88 |
| 2012/0311649 A1* | 12/2012 | Patten .................... G06Q 30/02 725/97 |
| 2015/0281752 A1* | 10/2015 | Van Veldhuisen .......................... H04N 21/2368 725/116 |

* cited by examiner

*Primary Examiner* — Michael S McNally
(74) *Attorney, Agent, or Firm* — Knobbe, Martens, Olson & Bear, LLP (57) ABSTRACT

Systems and methods are described to enable replacement, in a packaged content stream, of a first encoded content stream with a second encoded content stream, without requiring decoding of the encoded content streams. A controller can receive a request to replace the first encoded content stream with the second encoded content stream at a specified location (e.g., a particular time). The controller can then instruct encoders associated with the respective content streams to insert a splice point frame into the respective content streams at the specified location, which splice point frame breaks inter frame dependency before and after the splice point frame. A packager can then replace the first encoded content stream with the second encoded content stream at the location of the splice point frame in the packaged content stream, without introducing errors into the packaged content stream as a result of broken inter frame dependency.

21 Claims, 6 Drawing Sheets

OUTPUT SWITCHING FOR ENCODED CONTENT STREAMS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ interconnected computing devices (e.g., within data centers) to deliver content to users or clients. In some instances, these computing devices may support traditional content distribution systems, such as by creating, modifying, or distributing streaming television or radio content. In other instances, these computing devices may serve to replicate or replace prior content distribution systems. For example, data centers can provide network-based streaming audio or video content in a manner similar to traditional television or radio networks. This content is sometimes referred to as "internet television" or "internet radio," respectively. The content provided by these distribution systems (e.g., both traditional and computing network-based) may be pre-recorded, or live. Often, where computing devices are used to facilitate either traditional or network-based distribution systems, specialized software is used to replace or replicate functionality of dedicated hardware devices. For example, software applications may be used to encode and package a data stream containing live video content, thus reducing or eliminating the need for dedicated hardware to perform these functions. Because of the flexibility of software-based solutions, a single computing device may be utilized to generate content for both traditional and network-based generation systems.

DETAILED DESCRIPTION

Generally described, the present disclosure relates to switching an output content stream, such as a video content stream, between multiple encoded input content streams without introducing errors into the output stream and without requiring decoding or decompression of the input content streams. As described herein, streaming content can include any content that is intended to be processed (e.g., ingested, encoded, packaged, etc.) and delivered in "real-time," such as television, radio, or network-based content streams. In one embodiment, streaming content is live content (e.g., being both recorded and presented in "real-time," which may include minor delays, such as to provide the ability for content censoring or filtering). Embodiments of the present disclosure enable encoders providing input content streams to selectively include splice point frames, such as "Instantaneous Decoder Refresh" (or "IDR") frames, into a common location of the multiple encoded input content streams. Thereafter, a content packager or other output device may replace a first encoded input content stream with a second encoded input content stream at the location of the IDR frame, resulting in a seamless switching of input content streams without requiring decoding of the input content streams.

Switching an output content stream can be beneficial in many instances. For example, a streaming content provider, such as a television station or network streaming provider, may provide a live stream of content, but wish to alter that live stream for certain geographical locations (e.g., due to licensing restrictions). Thus, at a certain point in time, the streaming content provider may desire to switch a content stream output to the relevant locations from a first content stream, such as a first sports match, to a second content stream, such as a second sports match. As another example, a director of a live event may wish to switch an output content stream between multiple input content streams, each providing a different view of the live event (e.g., the director may wish to "cut" to a different camera).

Where the first and second content streams are encoded, such switching is likely to cause errors in the output content stream due to the nature of commonly used encoding formats. Specifically, commonly used encoding formats generally rely on inter frame prediction to encode many or most content frames, in which the content of a first frame is expressed in terms of the content of another frame either preceding or following the first frame. Thus, suddenly switching an output content stream between multiple encoded input content streams is likely to result in errors in the output content stream, as frames of either or both encoded input content streams are expressed in terms of other frames not present in the output content stream (due to the replacement of one input content stream with another). These errors can manifest as graphical artifacts when the stream is rendered to a viewer, and are thus undesirable.

One mechanism for avoiding errors in an output content stream is to switch input content streams prior to encoding. For example, a director of a live event may directly control outputs of various cameras at the event, before the output is compressed or encoded. While this technique can be effective, it has numerous disadvantages. Specifically, a director must generally be in a location that can receive an uninterrupted, uncompressed, high speed content stream from the event. Typically, this requires the director to be nearby to the event to avoid excessive costs and equipment. Another disadvantage is that the output content stream is relatively fixed to downstream viewers, such that a later viewer is not able to view any stream other than that selected by the director. Thus, this technique is ineffective in enabling regional customization of an output stream.

Another mechanism for avoiding errors in an output content stream is to decode input content streams prior to switching, and then re-encode the output content stream. For example, to enable regional customization of an output stream, each regional provider (e.g., television station) may receive one or more input content streams in an encoded format. When a provider wishes to switch the output content stream from one encoded input content stream (e.g., one sports match) to another, the provider may decode both input content streams, combine the decoded content streams as required for replacement, and reencode an output content stream for delivery to downstream viewers. This process is disadvantageous, as it is both costly and inefficient in terms of computing resource usage (often requiring multiple specialized computing devices, particularly where a high quality content stream is desired). Moreover, decoding and reencoding content streams generally results in a loss in quality of the underlying content.

To address these issues, the present disclosure describes systems and methods to enable switching an output content stream between multiple encoded input content streams, without requiring decoding of the input content streams and without resulting in errors in the output content stream. Specifically, the present disclosure utilizes specialized content frames, generally referred to herein as "splice point frames" within encoded input content streams, which frames break the inter frame dependency of a content stream at a specific point, such that any subsequent frames may be decoded without reference to any frame prior to the splice point frame (and such that frames prior to the splice point frame may be decoded without reference to any frame subsequent to the splice point frame). One example of such a specialized content frame is the IDR frame, defined by the H.264 video encoding format, which format is known in the art. An IDR frame, when inserted into an H.264 compliant video stream, ensures that all subsequent frames of the video stream can be decoded without reference to any frame of the video stream prior to the IDR frame. In accordance with the present disclosure, such an IDR frame can be utilized as a splice point within a content stream. Specifically, where it is desired to switch an output content stream between two input content streams, an IDR frame can be inserted into the destination content stream, and the output can be switched to including the destination content stream at the location of the IDR frame. Thereafter, a downstream decoder decoding the content stream can decode the output content stream both prior to and after the IDR frame, without any errors due to loss of inter frame dependencies.

Embodiments of the present disclosure may further reduce errors in output content streams by "synchronizing" input content streams prior to switching between those input content streams. Specifically, various aspects of the input content streams, such as timestamps audio frame boundaries, or segmentation boundaries may be synchronized between the input content streams, such that switching between the input content streams causes no disruption in those aspects of the output content stream. In this manner, a downstream decoder of the output content stream may be unable to detect that any alteration of input content streams had occurred within the output content stream. Mechanisms for synchronizing input content streams are disclosed, for example, in U.S. patent application Ser. No. 15/194,347, entitled "SYNCHRONIZATION OF MULTIPLE ENCODERS FOR STREAMING CONTENT" and filed Jun. 27, 2016 ("the '347 Application"), the entirety of which is hereby incorporated by reference. To further reduce the potential for introducing errors in a stream, embodiments of the present disclosure may modify the bitrate of encoded content streams around a splice point frame, to ensure that the bitrate of the output stream (e.g. combining two different encoded input streams) is compliant with relevant buffer requirements. For example, an output switch controller as described herein may cause content encoders for each encoded input stream to be combined into a packaged output stream to exchange information regarding the raw input streams to be encoded, and to modify their encoding such that the encoded streams can be combined into an packaged output stream while maintaining an acceptable overall bitrate in the output stream.

As will be appreciated by one of skill in the art in light of the present disclosure, the embodiments disclosed herein improves the ability of computing systems, such as content streaming systems, to deliver content to users. Specifically, aspects of the present disclosure improve the ability of content streaming systems to seamlessly alter what encoded content stream is used as an input to an output content stream, without introducing errors into the output content stream and without requiring decoding of the input content streams. Moreover, the presently disclosed embodiments address technical problems inherent within computing systems; specifically, the limited ability of computing devices to transmit unencoded (e.g., uncompressed) information, the limited ability of computing devices to decode and encode content, and the inherent errors that occur when attempting to combine encoded information under prior systems. These technical problems are addressed by the various technical solutions described herein, including the synchronized inclusion of specialized content frames by content encoders into multiple content streams, the detection of such a content frame by an output device, and the switching of an output stream to an alternative encoded input stream at the location of the specialized content frame to result in a seamless replacement of the encoded input content stream. Thus, the present disclosure represents an improvement on existing content streaming systems and computing systems in general.

The foregoing aspects and many of the attendant advantages of the present disclosure will become more readily appreciated as the same become better understood by reference to the following, when taken in conjunction with the accompanying drawings.

Figure 1:
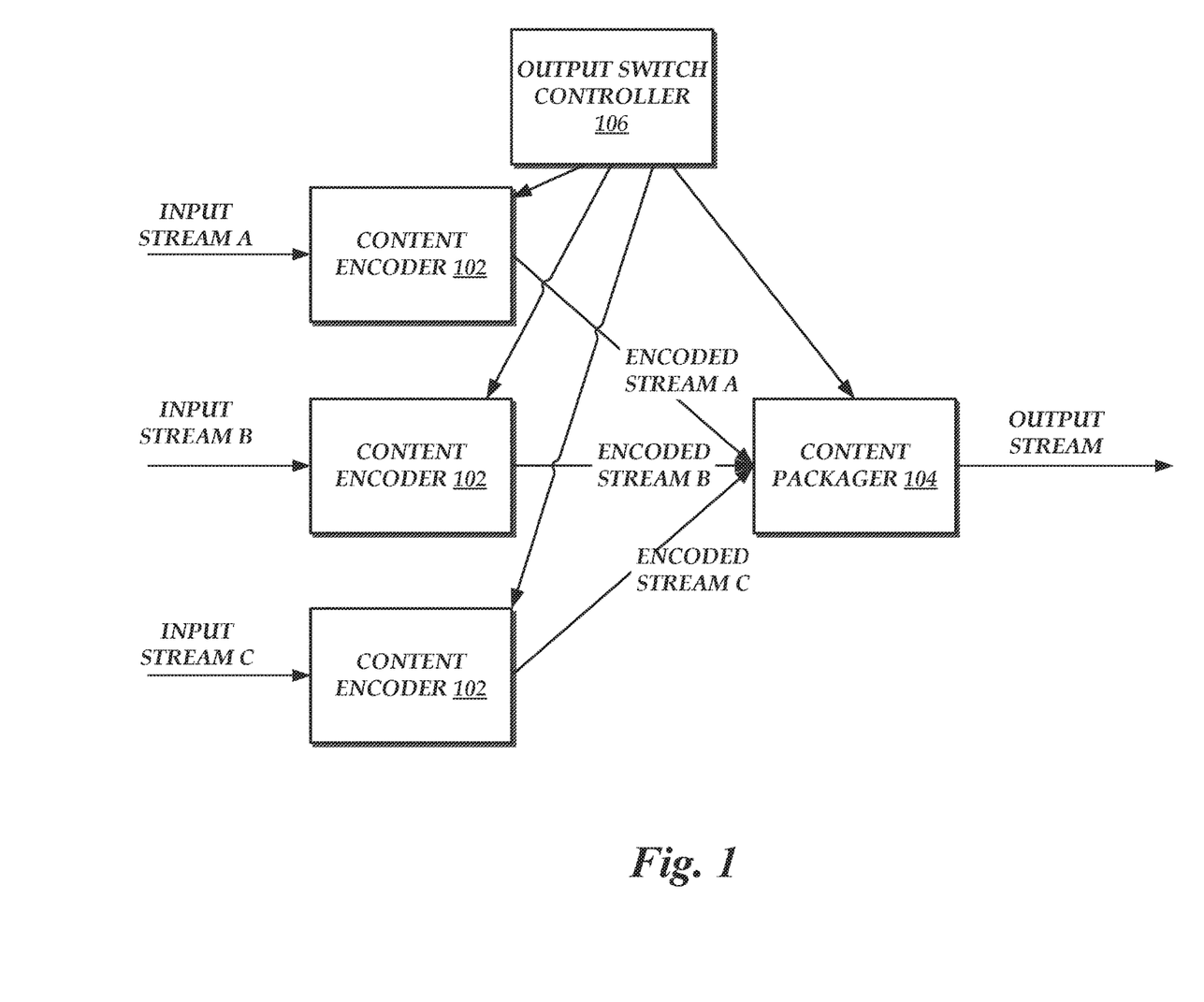
FIG. 1 is a block diagram depicting an illustrative logical environment for encoding and packaging streaming content, as well as for switching the output encoded content without requiring decoding of the content streams; the logical environment includes multiple content encoders, a content packager, and an output switch controller.

FIG. 1 is a block diagram depicting an illustrative environment including multiple content encoders 102, a content packager 104, and a output switch controller 106 configured to enable seamless switching of an output of the content packager 104 between encoded content streams provided by the content encoders 102.

As shown in FIG. 1, each of the content encoders 102 obtains an input stream (input streams A, B, and C as shown in FIG. 1) of content to be encoded. Illustratively, the input streams may be uncompressed (e.g., "raw") input data, or lightly compressed input data. In one embodiment, the input streams include video and/or audio data, such as data from a "live" recording of an event. For the purposes of description of FIG. 1, it is assumed that each of the input streams represents a different stream of data, either from the same event or from different events. Each of the content encoders 102 is configured to obtain the input stream, encode the input stream into an encoded stream, and output that encoded stream to the content packager 104. Illustratively, the encoder 102 may encode the obtained content into any number of known formats, including but not limited to H.263, H.264, H.265, MICROSOFT SMPTE 421M (also known as VC-1), APPLE™ ProRes, APPLE Intermediate Codec, VP3 through 9, Motion JPEG ("M-JPEG"), MPEG-2 part 2, RealVideo, Dirac, Theora, and MPEG-4 Part 2 (for video), and Vorbis, Opus, MP3, advanced audio coding ("AAC"), pulse-code modulation ("PCM"), dedicated to sound ("DTS"), MPEG-1, audio coding 3 ("AC-3"), free lossless audio codec ("FLAC"), and RealAudio (for audio), or combinations thereof.

On receiving the encoded streams, the content packager 104 may package one or more of the encoded streams into a container format suitable for delivery in the output stream. As will be recognized by one of skill in the art, a container format may generally combine encoded audio and video into a file, potentially along with synchronization information for the audio and video, subtitles, metadata, or other information. Examples of containers include, but are not limited to, Matroska, FLV, MPEG-4 Part 12, VOB, Ogg, Audio Video Interleave ("AVI"), Quicktime, Advanced Systems Format ("ASF"), RealMedia, and MPEG Transport Stream ("MPEG-TS"). In some instances, containers may include exclusively audio or exclusively video, rather than a combination of the two. In one embodiment, content packagers 104 may package the content into multiple container files, such as multiple transport stream files, and generate additional information enabling distribution systems and/or content output devices to distribute or consume the packaged content. For example, the content packager 104 may package the encoded content according to streaming protocols, such as Hypertext Transport Protocol ("HTTP") Live Streaming ("HLS") or MPEG Dynamic Adaptive Streaming over HTTP ("MPEG-DASH"), and generate metadata regarding the encoded content, such as manifest file identifying each package of encoded content. In one embodiment, the container type generated by a packager 104 may be different than a container type in which an encoded content stream is received. For example, a packager 104 may receive an encoded content stream as an MPEG-TS file, and package the encoded content stream into a MPEG-4 Part 12 file. In other embodiments, a packager 104 receive an encoded content stream in a first container format, and package the stream into the same container format. Illustratively, a packager 104 may receive an encoded content stream as an MPEG-TS file, and package the encoded content stream into another MPEG-TS file. In this way, a packager 104 may in some instances act as a "proxy" or "hub" for encoded content streams, repeating or redirecting an encoded content stream to one or more downstream devices. Encoding and packaging of content streams, such as audio/visual streams, is generally known in the art, and thus existing encoding and packaging techniques will not be described in detail herein.

As would be recognized by one skilled in the art, encoding provides a number of benefits over unencoded data, including a reduction in bandwidth required to transmit the content stream. However, encoding data also generally requires "decoding" prior to viewing (and in many instances, prior to modification). For the purposes of the present description, it will be assumed that each of the encoded streams provided by the encoders 102 utilizes inter frame prediction. Inter frame prediction is an encoding technique known in the art and utilized by many encoding formats, such as formats promulgated by the Moving Picture Experts Group (MPEG). As noted above, inter frame prediction generally encodes one or more frames of a content stream with reference to other frames of the content, such that separation of the frames may result in errors during decoding of the content stream. While inter frame prediction provides for compression of a content stream, it creates difficulties in some instances during operation of a content packager 104. For example, as discussed above, there may be instances in which a content packager 104 would like to switch from providing a first encoded content stream (e.g., encoded content stream A) to providing a second encoded content stream (e.g., encoded content stream B) as the output stream. Illustratively, the first encoded content stream may, at a given point in time, correspond to content that is regionally prohibited from being distributed by the content packager 104. Thus, it would be beneficial for the content packager 104, at that point in time, to switch to providing the second content stream as the output stream. However, where the encoded content streams utilize inter frame prediction, switching to a different encoded content stream at the content packager 104 is likely to cause errors in the output stream (as inter frame dependency in the output stream would likely reference frames that are not included in the output content stream). While it may be possible to remove these errors by decoding and reencoding the second content stream prior to packaging, the content packager 104 may not be configured to conduct such decoding and reencoding (and, in any case, such a process would likely consume large amounts of computing resources and create inefficiencies in use of computing resources).

To address the inability for the content packager 104 to switch between packaging different encoded content streams, the system of FIG. 1 further includes an output switch controller 106 configured to coordinate operation of the content encoders 102 and content packagers 104, such that the content packager 104 is enabled at a given point in time to switch between packaging a first encoded content stream and a second encoded content stream, without requiring decoding of the content streams and without introducing errors into an output stream. Specifically, the output switch controller 106 is configured to instruct each of the content encoders 102 to insert, at a given point in time, a splice point frame into their respective encoded content streams, and to ensure that subsequent frames of the encoded content stream to not reference any frame prior to the splice point frame. The splice point frame thus acts as a "switch point," such that a viewing device can begin viewing the encoded content stream from a point corresponding to the splice point frame, without errors due to lost inter frame dependency. In one embodiment, the splice point frame is an IDR frame satisfying the H.264 video encoding format.

The output switch controller 106 is further configured to instruct the content packager 104 as to the time at which the encoded content streams are expected to include a splice point frame. Thus, the content packager 104, at the point in time, may switch from packaging a first encoded content stream into the output stream to packaging a second encoded content stream into the output stream. Because the content packager 104 switches to the second encoded content stream at a time corresponding to the splice point frame, subsequent decoding of the content stream can occur without experiencing errors due to lost inter frame dependency. In this way, the content packager 104 is enabled to switch an output stream to any number of encoded content streams, without introducing errors in the output stream and without being required to decode and reencode the content streams.

Each of the content encoders 102, content packager 104, and output controller switch 106 may correspond to a computing device including a processor, memory, and interfaces configured to enable the functionalities described herein. One illustrative example of such a computing device is described with reference to FIG. 2, below. In some instances, any of the content encoders 102, content packager 104, and output controller switch 106 may be implemented by a general purpose computing device configured with specific computer-executable instructions to undertake the functionalities recited herein. In other instances, any of the content encoders 102, content packager 104, and output controller switch 106 may be implemented as special purposes computing device, such as special purpose encoders or packagers. Still further, any of the any of the content encoders 102, content packager 104, and output controller switch 106 may be implemented as a virtual computing device executing on a hosted computing environment. A hosted computing environment may include one or more rapidly provisioned and released computing resources, which computing resources may include computing, networking and/or storage devices. A hosted computing environment may also be referred to as a cloud computing environment.

The configuration and arrangement of the elements of FIG. 1 may vary according to embodiments of the present disclosure. In a first embodiment, each of the content encoders 102 may be located proximate to a source of a recording device (e.g., "on premises"), such as a video camera, and receive the input content streams via a direct connection to the recording device. That direct connection may include, for example, a serial digital interface (SDI) to the recording device. In a second embodiment, each of content encoders 102 may be located remotely from a source recording device, and receive the input content streams via a network interface. The network interface may include, for example, an interface to a local area network (LAN), wide area network (WAN), or global area network (GAN) such as the Internet, and enable communication via a known protocol, such as the Transmission Control Protocol/Internet Protocol (TCP/IP). The interface may be wired interface, such as a wired Ethernet interface, or a wireless connection, such as an interface compatible with the Institute of Electrical and Electronics Engineers (IEEE) 802.11 family of protocols. A variety of network types and corresponding interfaces are known in the art and will not be described in detail here. The content encoders 102 may for example be implemented as virtual computing devices in a hosted computing environment or content distribution system, and receive input content streams as an uncompressed or lightly compressed MPEG Transport Stream (MPEG-TS).

Each encoder 102 further transmit an encoded content stream (generated from an input content stream) to the content packager 104. In one embodiment, the encoders 102 and content packager 104 each include a network interface enabling communication over a LAN, WAN, or GAN. In another embodiment, the content packager 104 and one or more of the encoders 102 are implemented in a common host computing device, and thus communicate via internal communication channels of the host computing device. The encoded content streams may be transmitted as an MPEG-TS stream to the content packager 104 for packaging into an output stream. In one embodiment, the output stream may be transmitted via a network interface (e.g., to a LAN, WAN, or GAN) within a container file, examples of which are provided above. Illustratively, the output stream may be transmitted to a client computing device for decoding and output to a user. In another embodiment, the output stream be output via alternative communication channels, such as satellite or terrestrial television channels (including over-the-air broadcast, cable networks, fiber-optic network television networks, etc.).

The output switch controller 106 may communicate with the content encoders 102 and content packager 104 via any available interface to the content encoders 102 and content packager 104. In one embodiment, the output switch controller 106 may communicate with the content encoders 102 and content packager 104 via a network interface, via TCP/IP. Illustratively, the content encoders 102 may expose an application programming interface (API) enabling instruction by the output switch controller 106 that a splice point frame should be inserted at a given location in encoded content streams (e.g., a given timestamp or time code), and the output switch controller 106 may utilize that API to instruct encoders 102 to insert a splice point frame at a particular location. In other instances, the output switch controller 106 may utilize existing communication protocols to notify the content encoders 102 to insert a splice point frame into an encoded content stream. For example, the output switch controller 106 may in one embodiment have inline access to an input stream (e.g., by acting as a source of the input stream from the viewpoint of the content encoder 102), and utilize the SCTE-35 or SCTE-104 standards to insert "cue tones" into the input stream. The content encoders 102 may be configured to respond to such cue tones by inserting a splice point frame into an encoded stream at the location of the cue tone, thus enabling a packager to switch between multiple encoded content streams (e.g., multiple live streams). To minimize communication distance between the output switch controller 106 and the content encoders 102, the output switch controller 106 may in some instances be located nearby to the content encoders 102.

The content packager 104 may similarly provide an interface via which to receive instructions to switch from packaging a first encoded stream to a second encoded stream, as well as a location within the streams at which to make the switch. Illustratively, the content packager 104 may provide an API through which to receive such instructions (e.g., via a communication network interface). In one embodiment, the output switch controller 106 and content packager 104 may be implemented by a common computing device, or functionality of the output switch controller 106 may be implemented directly by the content packager 104, and thus no external interface between the output switch controller 106 and content packager 104 may be required. In another embodiment, functionality of the output switch controller 106 may be incorporated into each content encoder 102. For example, output switch controllers 106 implemented within each content encoder 102 may communicate with one another (e.g., via peer-to-peer communications), such that a request to switch between encoded content streams can be received at any encoder 102 and passed to output switch controllers 106 at the other encoders 102.

The output switch controller 106 can further include one or more interfaces through which to receive a request switching between encoded content streams at a content packager 104. For example, the output switch controller 106 may make available (e.g., on a network interface) an API through which a request to switch between encoded content streams can be received (e.g., as a result of human or automatic operation of a computing device). In some instances, the output switch controller 106 may include mechanical interfaces, such as a button, switch, or dial, through which to request switching between encoded content streams. Illustratively, the output switch controller 106 may include a switch whereby each of the encoded content streams to the content packager 104 is selectable, and selection of encoded content stream 104 may cause the output switch controller 106 to transmit instructions to the content encoders 102 and content packager 104 to switch an output stream to the selected encoded content stream. Illustratively, such a switch may be used by a director directing a multi-camera recording of a live event, to switch (at the level of the encoded streams) between views of the live event provided in the output stream. In another embodiment, the output switch controller 106 may include logical switches made available through an electronic user interface. For example, a director may access a web-based interface (e.g., a hypertext markup language, or "HTML," formatted network content item) that corresponds to a graphical user interface through which an output stream could be switched between encoded content streams. The graphical user interface may further include each encoded content stream, thus enabling a director to be physically remote from the sources of the input streams. In yet another embodiment, an interface to the output switch controller 106 may be made available to end viewers, such that end viewers are enabled to switch a content stream viewed by the end viewer (e.g., on a computing device of the end viewer) between various encoded streams. Illustratively, an end viewer may be provided with relatively low quality versions of each encoded stream (to reduce the computing resources, such as processing power and bandwidth required to view the various encoded streams), and then select an individual encoded stream in order to switch a relatively high quality output stream to the selected encoded stream. In this manner, users can be enabled to seamlessly switch between multiple encoded content streams without being required, at an end user device, to obtain and decode a high quality version of each encoded content stream.

While a limited number of content encoders 102, content packagers 104, and output switch controllers 106 are shown in FIG. 1 for simplicity, embodiments of the present disclosure may include any number of content encoders 102, content packagers 104, and output switch controllers 106. Illustratively, one or more content packagers 104 may exist in or to service a variety of different geographic locations, each with geographic restrictions as to the content of their corresponding output streams. Each content packager 104 may communicate with a number of content encoders 102 providing encoded content streams for potential inclusion in an output stream of the content packager 104, as well as one or more output switch controller 106 corresponding to the content encoders 102. Thus, the configuration of content encoders 102, content packagers 104, and output switch controllers 106 shown in FIG. 1 is illustrative in nature.

Similarly, while a limited number of input streams, encoded streams, and output streams is shown in FIG. 1 for simplicity, each content encoder 102 may be configured to receive more than one input stream, and/or be configured to provide more than one output stream. Illustratively, a single content encoder 102 may encode multiple input content streams and provide a corresponding number of encoded content streams, particularly where the input content streams are of low resolution (and thus generally require lower amounts of computing resources to encoder). As a further illustration, a content encoder 102 may encode a single input content stream into multiple encoded content streams with varying encoding parameters, such as multiple encoded content streams of varying resolution. Similarly, a content packager 104 may package different encoded content streams into different output streams, may package the same encoded content stream into multiple output streams (e.g., corresponding to different container types), or may package multiple encoded content streams into a single output stream (e.g., as a container including multiple resolutions of common content). Thus, the number and configuration of content streams in FIG. 1 is intended to be illustrative in nature.

While note shown in FIG. 1, the content encoders 102 may in some embodiments be in communication with one another. For example, the content encoders 102 may be networked in order to enable synchronization of encoded content streams provided by the encoders 102, in accordance with embodiments of the '347 Application, incorporated by reference above. Illustratively, each of the content encoders 102 may communicate in order to synchronize encoder state, and thus to provide encoded content streams with synchronizations according to any one or more of timestamps, timecodes, segmentation boundaries, etc. Synchronization of encoder states between the content encoders 102 may be beneficial, for example, to enable continuity of encoding values within an output content stream. For example, where two content encoders 102 as synchronized with respect to timestamps, timecodes, and segmentation boundaries, switching an output stream between the encoded content streams of the two content encoders 102 is unlikely to have any effect on the timestamps, timecodes, or segmentation boundaries of the output stream. Thus, a downstream decoding device may be unaware that any switching between encoded content streams occurred within the output stream, and such switching may be unlikely to result in errors at the downstream decoding device (e.g., due to non-contiguous timestamps or timecodes, or an unexpected segmentation boundary).

Figure 2:
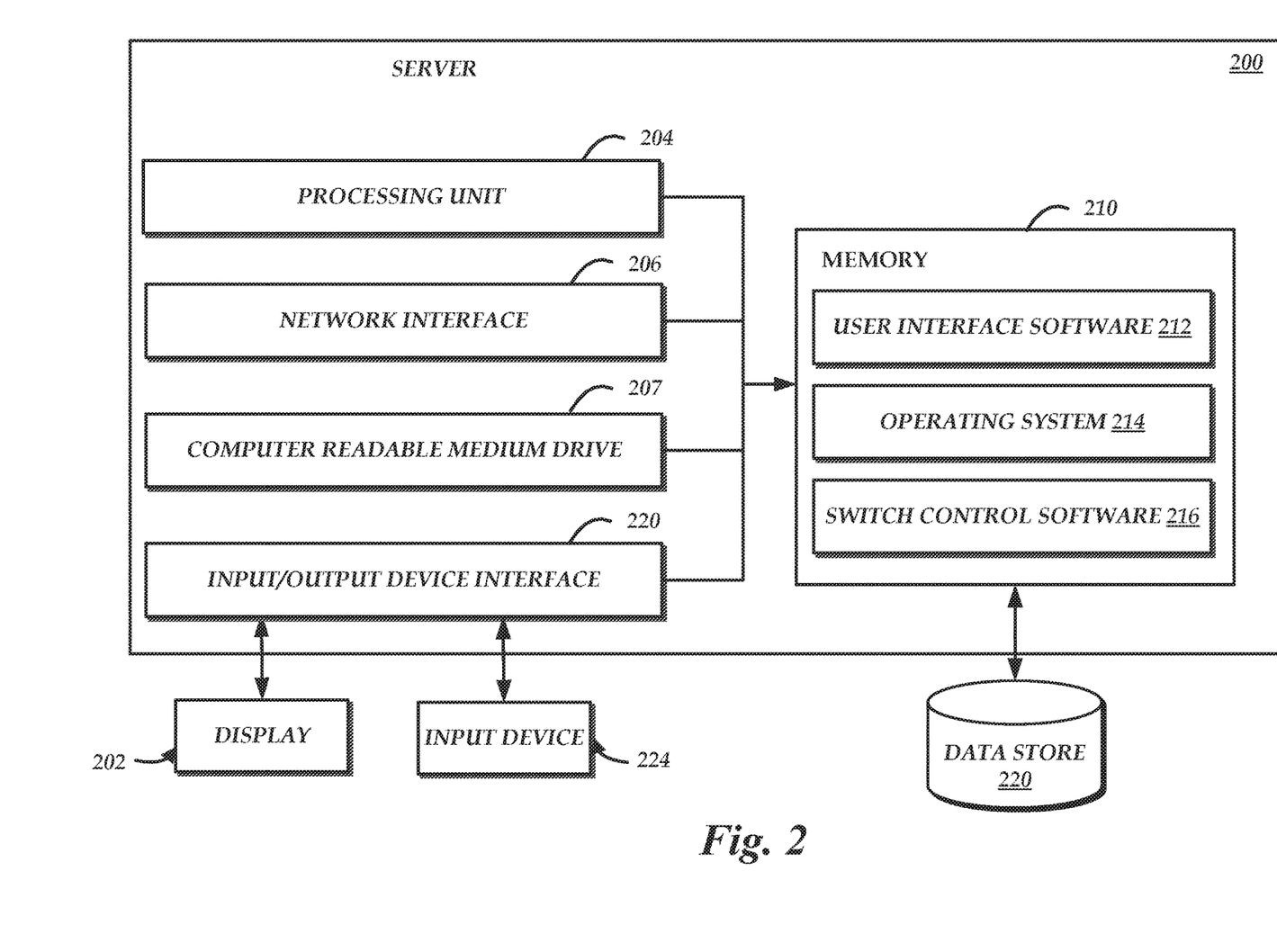
FIG. 2 is a block diagram depicting an illustrative configuration of one embodiment of a server than may implement an output switch controller of FIG. 1, and that may operate to instruct content encoders and content packagers to enable switching an output of the content packager between multiple encoded content streams, without requiring decoding of the content streams.

FIG. 2 depicts one embodiment of an architecture of a server 200 that may implement an output switch controller 106 described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 220, a display 202, and an input device 224, all of which may communicate with one another by way of a communication bus. The network interface 206 may provide connectivity to one or more networks or computing systems, such as a LAN, WAN, or GAN. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, switch, dial, knob, button, etc. In some embodiments, the server 200 may include more (or fewer) components than those shown in FIG. 2. For example, some embodiments of the server 200 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes RAM, ROM, and/or other persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as data store 120, which may correspond to any persistent or substantially persistent data storage, such as a hard drive (HDD), a solid state drive (SDD), network attached storage (NAS), a tape drive, or any combination thereof.

In addition to the user interface module 212, the memory 210 may include switch control software 216 that may be executed by the processing unit 204. In one embodiment, the switch control software 216 implements various aspects of the present disclosure, e.g., receiving a request to switch an output of a content packager between encoded content streams at a given location, instructing encoders corresponding to the content streams to insert splice point frames at the given location of the content streams, and instructing a content packager to switch an output content stream to the desired encoded content stream at the given location. While the switch control software 216 is shown in FIG. 2 as part of the server 200, in other embodiments, all or a portion of the software may be implemented by alternative computing devices, such as virtual computing devices within a hosted computing environment or a special purpose content packager computing device. Moreover, while FIG. 2 is described with respect to an output switch controller 106, the software within the memory 210 may additionally or alternatively include instructions to implement other components of the present disclosure, such as a content encoder 102 or a content packager 104.

Figure 3A:
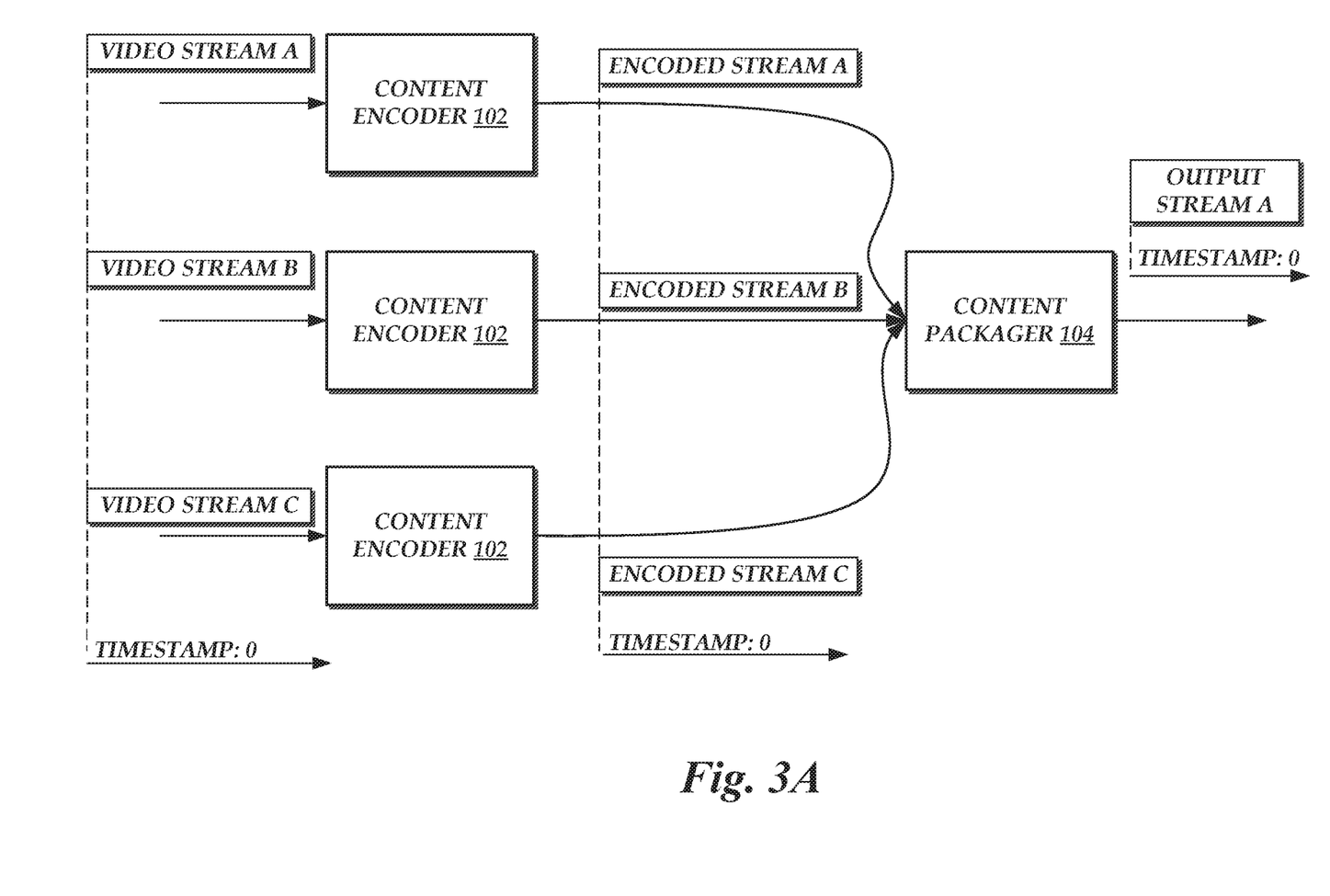
FIGS. 3A-3C are block diagrams depicting illustrative interactions of elements of FIG. 1 to package an encoded content stream for output and to seamlessly switch the encoded content stream at a content packager without requiring decoding of the content streams.
Figure 3B:
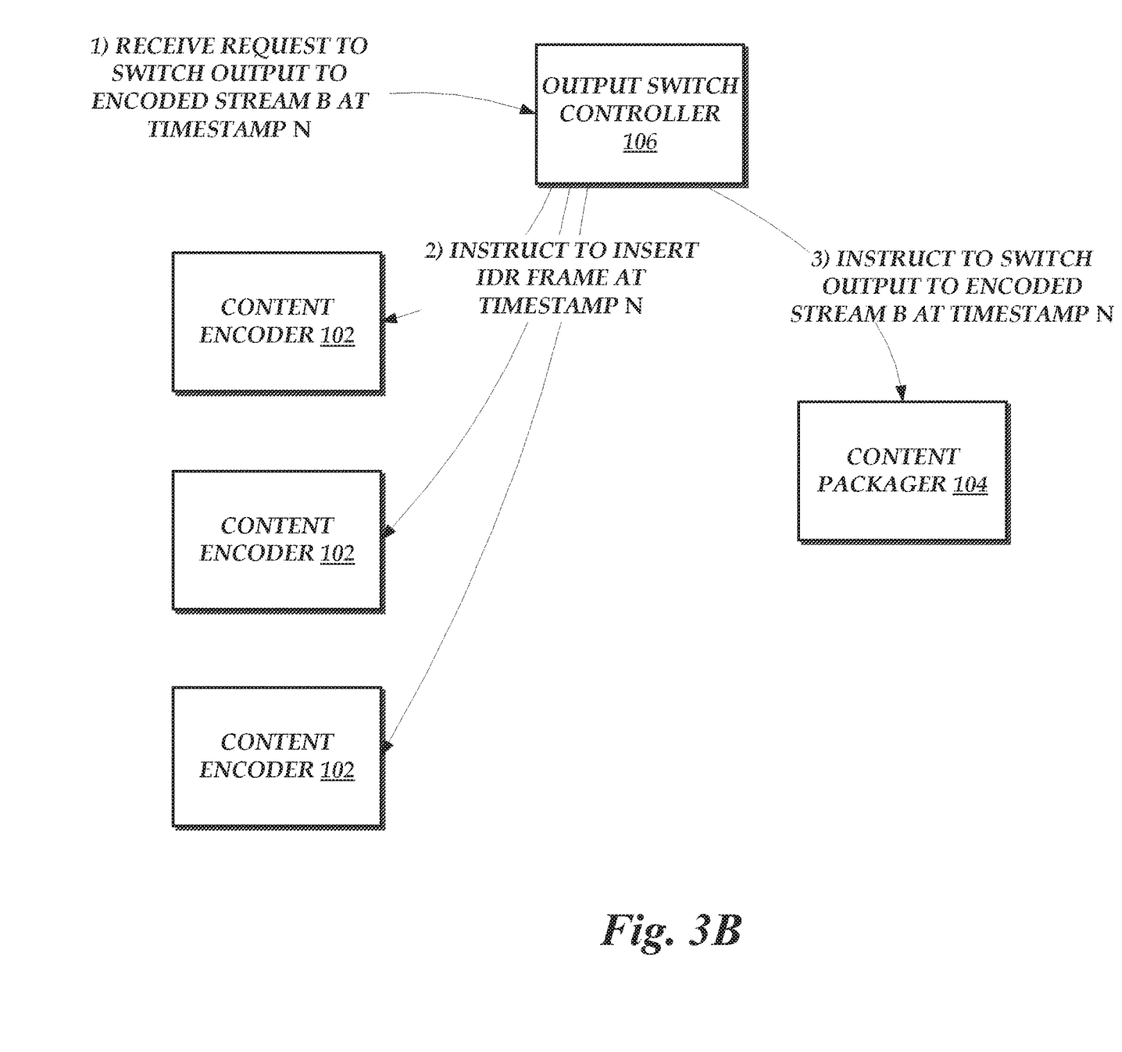
Figure 3C:
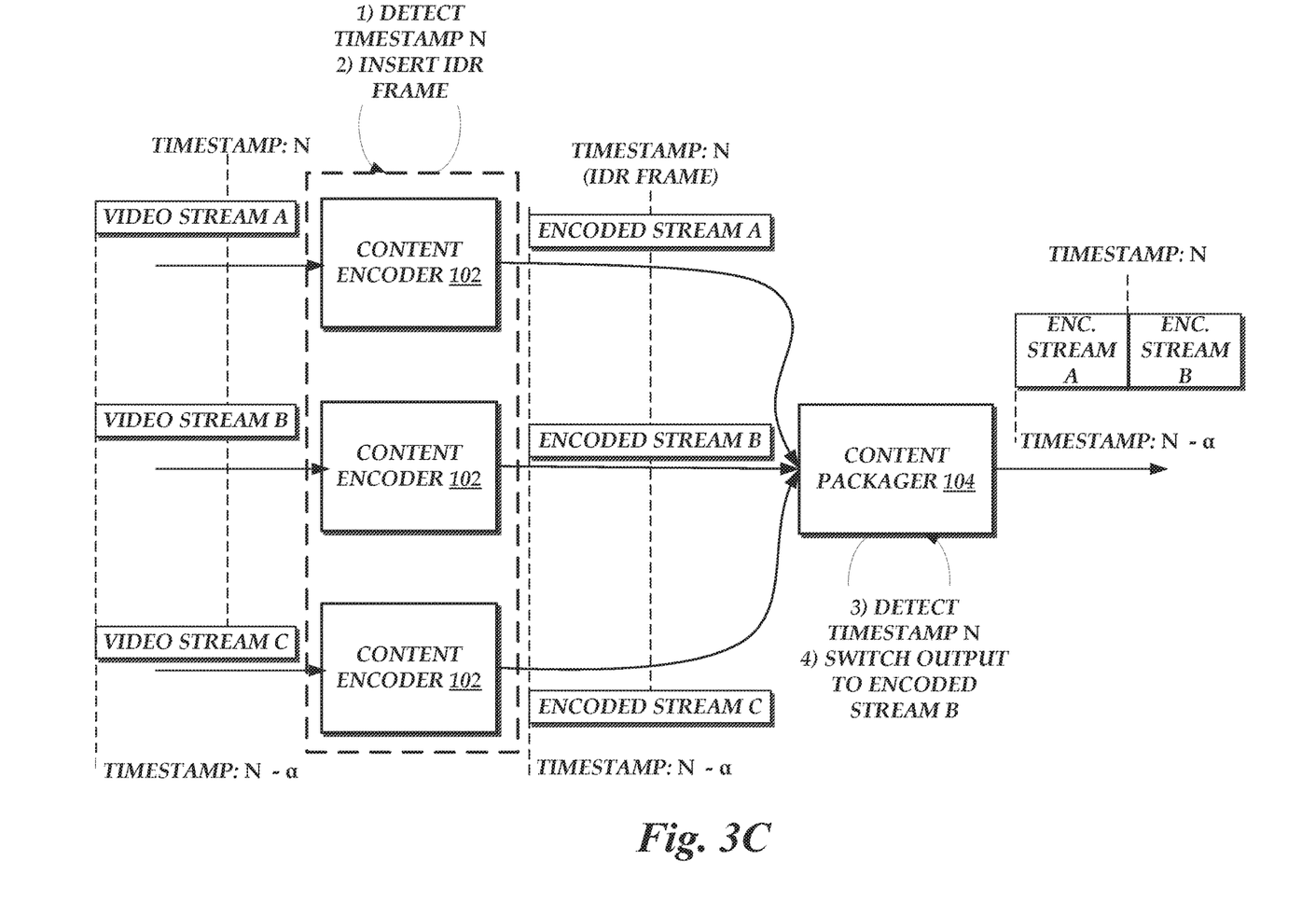

With reference to FIGS. 3A through 3C, a set of illustrative interactions will be described for seamlessly switching an output stream between multiple encoded content streams, without requiring decoding and reencoding of the encoded content streams. Specifically, FIG. 3A depicts operation of content encoders 102 and a content packager 104 during encoding of multiple video input streams, and packaging of a first encoded content stream into an output stream. FIG. 3B depicts operation of an output switch controller 106 to receive a request to switch the output stream to an alternative encoded content stream, and to instruct content encoders 102 and the content packager 104 accordingly. FIG. 3C depicts operation of the content encoders 102 and a content packager 104 in response to instructions from the output switch controller 106, thus resulting in switching of the output stream between multiple encoded content streams, without requiring decoding and reencoding of the encoded content streams.

With respect to FIG. 3A, an illustrative example is shown in which three content encoders 102 each receive a respective video content stream, labeled as video streams A, B, and C respective. Each video content stream may represent a different view of a common live event, or may represent distinct live events. For example, each video content stream may represent the feed of a different camera at a single sports match, or each video content stream may represent a recording of a different sports match. For ease of description, each of the video content streams is shown at beginning at a common timestamp (of zero). However, a common timestamp need not exist between the video content streams.

Each video content stream is received at a content encoder 102 (e.g., via an SDI cable, network interface, etc.), and encoded into a corresponding encoded content stream, labeled in FIG. 3A as encoded streams A, B, and C respectively. As discussed above, the encoded content streams may be encoded accordingly to any of a variety of formats. For example, each encoded content stream may be encoded according to the H.264 video encoding standard, and be included within an MPEG-TS file. In one embodiment, each encoded content stream may be encoded according to the same encoding parameters. In another embodiment, two or more of the encoded content streams may be encoded according to different but interchangeable encoding parameters (e.g., such that portions of two encoded content streams may be combined into an output stream and remain decodable by an output device). For ease of description, each of the encoded content streams is shown at beginning at a common timestamp (of zero). However, a common timestamp need not exist between the video content streams. Moreover, the timestamps of the encoded content streams need not match a timestamp of an input video content stream. To facilitate synchronous insertion of splice point frames into encoded content streams, each of the content encoders 102 may have some shared notion of time. In one embodiment, this shared notion of time is represented by synchronized encoder states, in accordance with embodiments of the '347 Application, incorporated by reference above. In another embodiment, the shared notion of time is a current local or geographical "real" time (e.g., the current time within a given time zone), which may be synchronized across content encoders 102 according to a variety of known techniques. As will be described below, this shared notion of time may serve as a basis to enable each of the content encoders 102 to include a splice point frame into the encoded content streams, to enable seamless switching between those encoded content streams.

With reference to FIG. 3B, illustrative interactions are shown for utilizing an output switch controller 106 to facilitate switching at a content packager 104 of an output stream to a different encoded content stream. The interactions of FIG. 3B may occur, for example, concurrently with the interactions of FIG. 3A (e.g., while the content encoders 102 continue to encode an input content stream and the content packager 104 continues to package an encoded content stream into an output stream).

The interactions of FIG. 3B begin at (1), where the output switch controller 106 receives a request to switch output of the content packager 104 from a first encoded content stream (e.g., encoded content stream A) to a second encoded content stream (e.g., encoded content stream B). In one embodiment, the request is received through a network interface of the output switch controller 106, such as via an API. In another embodiment, the request is received through another input to the output switch controller 106, such as selection of a physical switch or dial on the output switch controller 106.

As shown in FIG. 3B, the request indicates a timestamp N at which to switch the output stream. In one embodiment, the timestamp is specified in the request. For example, an API call may include a value corresponding to the specified timestamp. In another embodiment, no timestamp is specified in the request, and the output switch controller 106 determines that the request indicates that the output stream should be switch immediately or substantially immediately. While timestamps are described herein as an illustrative indication of location within an encoded content stream, any number of other location metrics could be specified in or indicated by a request, including time code, present real time, frame number, etc.

At (2), the output switch controller 106 transmits instructions to each content encoder 102 an instruction to insert a splice point frame at the specified timestamp N. While the instruction is shown in FIG. 3B as being transmitted to each content encoder 102, in some embodiments, the instruction may be transmitted only to content encoders 102 providing to the content packager 104 either a currently packaged stream or a stream to be switched to by the content packager 104. In the illustrative interactions of FIG. 3B, the encoders are assumed to be encoding H.264 compliant video, and thus the splice point frame is specified as an IDR frame under that protocol. In one embodiment, the instruction to insert an IDR frame may occur immediately or substantially immediately after receiving a request to switch the output stream between encoded content streams. In another embodiment, the output switch controller 106 may delay transmission of the instruction to insert the IDR frame until a threshold amount of time prior to the timestamp at which the IDR frame should be inserted. For example, if the timestamp N represents a time minutes, hours, or days in the future, the output switch controller 106 may delay transmission of the instruction to insert the IDR frame until a few seconds before the timestamp N will occur.

In another embodiment, where immediate switching of an output stream is desired, the output switch controller 106 may transmit the instruction immediately or substantially immediately (e.g., as quickly as practically possible). In some such embodiments, the content encoders 102 may implement an internal delay between timestamps of an input stream and timestamps of an encoded output stream, such that an IDR frame may be inserted at the specified timestamp N, even if that timestamp has passed in the input stream. For example, assume a director viewing the input streams wishes to switch the output stream between two encoded content streams immediately, and moves a dial on the output switch controller 106 to indicate that request. The output switch controller 106 may receive the request, and determine that the request is associated with a current timestamp of the input streams. However, because transmission of the instructions to the content encoders 102 may require non-trivial amount of time, the timestamp of the input content streams may have increased before the content encoders 102 receive the instruction. To address this issue, the content encoders 102 may maintain the input streams in an internal buffer, and delay encoding the input streams into encoded streams by a threshold amount of time (e.g., 8 seconds). As such, the content encoders 102 may input the IDR frame into the correct location after the delayed encoding, even if instructions are received after the relevant timestamp of the input stream has passed. As discussed above, the instructions to the content encoder 102 may in some instances be transmitted to an API of the content encoders 102 (e.g., over a communications network). In other instances, the instructions may be inserted into the input streams received at the content encoders 102, such as by insertion of SCTE-35 or SCTE-104 messages.

At (3), the output switch controller 106 further instructs the content packager 104 to switch outputs between the first encoded content stream and the second encoded content stream at the specified timestamp N. As will be discussed below, the content packager 104 may then begin, at the specified timestamp, to package the second encoded content stream into the output stream. While interaction (3) is numbered consecutively to interaction (2) for the purposes of description, these interactions may occur in any order, or concurrently. As noted above, the instruction of interaction (3) may be transmitted, for example, to an API of the content packager 104 (e.g., over a communication network).

While not shown in FIG. 3B, in some embodiments the output switch controller 106 may be configured to detect instances in which a splice point frame is expected to occur in each encoded stream regardless of an instruction to insert the splice point frame, and thus determine that no instruction to the encoders 102 is required. Illustratively, where the encoders 102 share synchronized encoder states (e.g., in accordance with embodiments of the '347 Application), the output switch controller 106 may be configured to communicate with one or all of the encoders 102 to determine where splice point frames are expected to be inserted during normal operation of the encoders 102 (e.g., every m seconds, m frames, etc.). The output switch controller 106 may further be configured (e.g., by an administrator) with a threshold acceptable time gap, such that if a splice point frame is expected to occur in the encoded streams of the encoders 102 within the threshold acceptable time after the requested time (e.g., timestamp n), then the output switch controller 106 declines to transmit the instructions to insert the splice point frames at the requested time. Instead, the output switch controller 106 may simply request that the content packager 106 switch between encoded streams at the location of the already expected splice point frame. In some instances, the acceptable time gap may be set based on an expected latency of communication between the output switch controller 106 and the encoders 102 (e.g., such that no instruction to encoders 102 is sent under circumstances when the instructions would be unlikely to reach the encoders 102 in time to implement the instructions).

With reference to FIG. 3C, illustrative interactions of the content encoders 102 and content packager 104 to seamless switch output streams between encoded content streams will be described. The interactions of FIG. 3C may occur, for example, subsequent to the interactions of FIGS. 3A and 3B.

As shown in FIG. 3C, each of the content encoders 102 continues to receive an input content stream (denoted as video streams A, B, and C in FIG. 3C), and to encode that input content stream into a corresponding encoded content stream. In the illustration of FIG. 3C, each video stream is denoted as starting at a point prior to the timestamp N, at which switching of an output stream between encoded content stream is requested to occur. This prior point is denoted as timestamp N−α in FIG. 3C. Each portion of a content stream further includes the location where an output content stream should be switched between a first input content stream and a second input content stream, denoted as timestamp N. A shown in FIG. 3C, between the timestamp N−α and the timestamp N, the output content stream includes a packaged version of encoded content stream A. At timestamp N and subsequently, the output content stream includes a packaged version of encoded content stream B.

To enable the output stream to include packaged versions of both content stream A and content stream B, operation of the content encoders 102 and the content packagers 104 can occur as depicted in FIG. 3C. Specifically, at 1), the respective content encoders 102 detect that a timestamp exists within the input content streams at which a splice point frame should be placed. Thereafter, at 2), the content encoders 102 encode the splice point frame (in this instance, and IDR frame) at the specified timestamp. Illustratively, the content encoders 102 may encode frames prior to and subsequent from the splice point frame such that inter frame prediction does not occur across the boundary of the splice point frame. Thus, the encoded content streams (denoted A, B, and C in FIG. 3C) include an IDR frame at a location corresponding to timestamp N. The encoded content streams are then passed to the content packager 104.

At (3), the content packager 104 detects the occurrence of the timestamp N within the encoded content streams. In one embodiment, this detection occurs by monitoring of timestamp values within the encoded content streams. In another embodiment, this detection occurs by monitoring of frame times within the encoded content streams to detect the IDR frames inserted at the location of timestamp N by the content encoders 102.

Thereafter, at (4), the content packager 104, at the location of the IDR frame, halts packaging of the first encoded content stream (content stream A) into the output stream, and begins packaging of the second encoded content stream (content stream B) into the output stream. As a result, the output content stream (as shown in FIG. 3C) includes both the first encoded content stream prior to the timestamp N and the second encoded content stream beginning at the timestamp N and thereafter. Because the first encoded content stream will include a splice point frame at the specified timestamp N, and because such a frame may cause any prior frames not to rely on inter frame prediction with respect to any frames subsequent to the splice point frame, halting inclusion of the first encoded content stream in the output content stream would not be expected to result in errors due to faulty inter frame prediction. Similarly, because the second encoded content stream will also include a splice point frame at the specified timestamp N, and because such a frame may cause any subsequent frames not to rely on inter frame prediction with respect to any frames prior to the splice point frame, beginning inclusion of the second encoded content stream in the output content stream would not be expected to result in errors due to faulty inter frame prediction. As such, switching of the output stream can occur without perceivable error to the end user. Moreover, where the encoder states of the relevant content encoders 102 are synchronized in accordance with the '347 Application, a downstream viewer may be unable to distinguish between the two encoded content streams as packaged within the output stream. Thus, the content packager 104 is enabled to seamlessly switch between packaging different encoded content streams into an output stream without decoding the encoded content streams and without introducing errors into the output stream.

Figure 4:
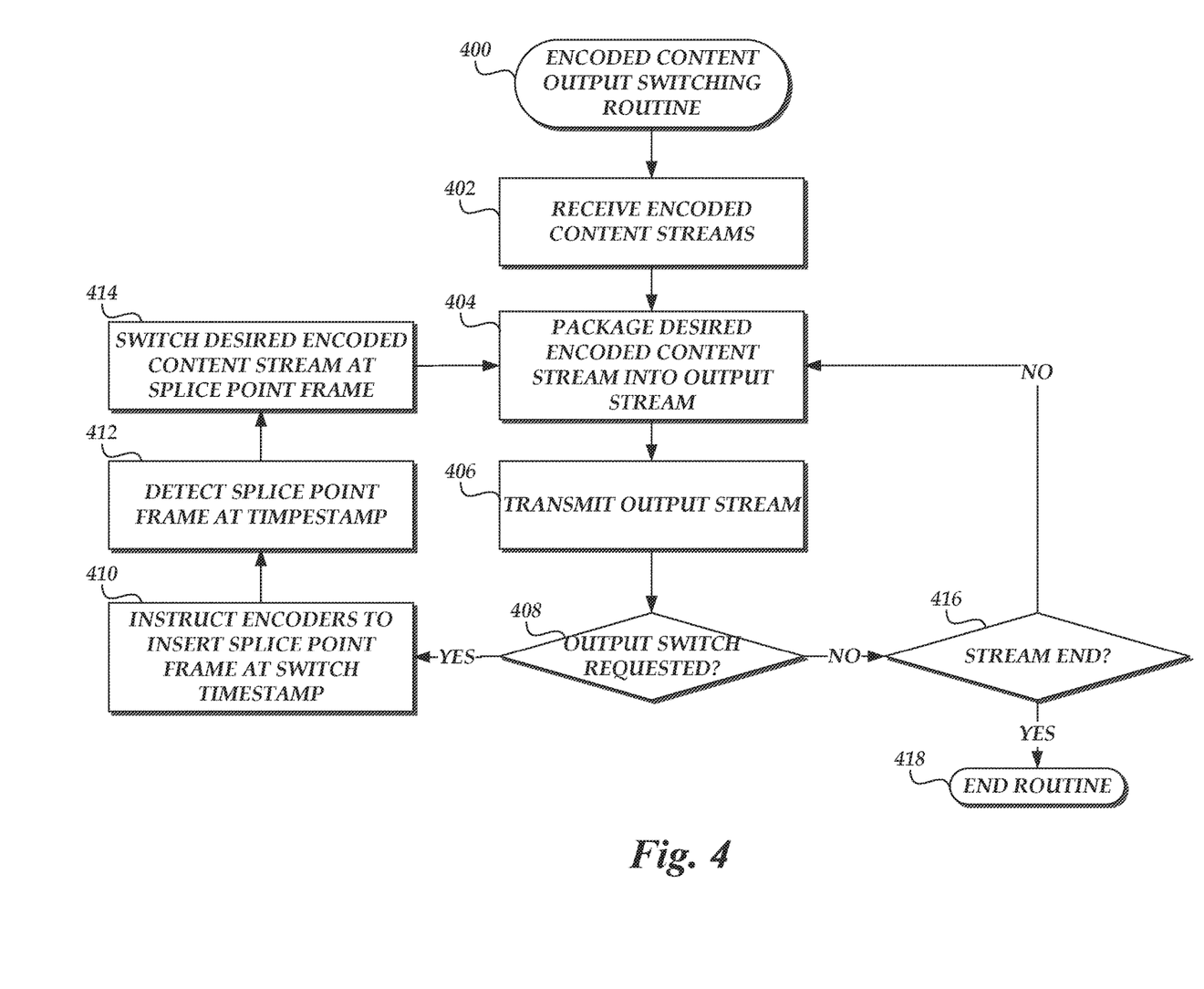
FIG. 4 is a flow chart depicting an illustrative routine for enabling seamless switching at a content packager between encoded content streams.

With reference to FIG. 4, one illustrative routine 400 that may be implemented to seamless switch between encoded content streams will be described. The routine 400 may be implemented, for example, by a content packager 104 of FIG. 1, in conjunction with an output switch controller of FIG. 1 (e.g., as a separate component or as functionality integrated within a content packager 104).

The routine 400 begins at block 402, where the content packager 104 receives a set of encoded content streams. As noted above, the encoded content streams may be received, for example, as MPEG-TS streams transmitted over a network to the content packager 104. At block 404, the content packager 104 packages at least one of the encoded content streams into an output stream. Illustratively, the content packager 104 may divide the MPEG-TS into a set of files, and package those files into a container for streaming (e.g., as an HLS or MPEG-DASH compliant stream). Thereafter, at block 406, the content packager 104 transmits the packaged output stream to a receiving device. As noted above, such transmission may occur over any number or combination of networks. For example, transmission of an output stream may occur over a LAN, WAN, or GAN to receiving computing devices, or may occur over broadcast networks, such as satellite, cable, or terrestrial television networks.

At block 408, the output switch controller 106 determines whether output switching from a first encoded content stream to a second encoded content stream has been requested. If no switching has been requested, the routine 416 continues to block 416, where the routine 400 varies according to whether the encoded content streams have ended. If the streams have not ended, the routine 400 returns to block 404 and repeats as discussed above. If the streams have ended, the routine 400 also ends at block 418.

In the instance that output switching has been requested at block 408, the routine 400 continues to block 410, where the output switch controller 106 transmits an instruction to the content encoders 102 to insert a splice point frame (e.g., an IDR frame) at a specified timestamp within the content streams. The specified timestamp may correspond, for example, to a timestamp specified within the request, or to a current timestamp with respect to a non-encoded input content stream.

At block 412, the content packager 104 detects a location in the encoded content streams corresponding to the specified timestamp (e.g., by detecting the splice point frame within the content streams or by monitoring timestamps of the content streams). Thereafter, at block 414 and as of the location in the encoded content streams corresponding to the specified timestamp, the content packager 104 halts inclusion of the first encoded content stream in the output stream, and begins inclusion of the second encoded content stream. Thus, the content packager 104 is enabled to seamlessly switch between packaging different encoded content streams into an output stream without decoding the encoded content streams and without introducing errors into the output stream. The routine 400 may then return to block 404 as described above.

While described in FIG. 4 as a single routine, a content packager 104 may in some instances implement the routine 400 as a series of sub-routines, executed at least partly in parallel. For example, a content packager 104 may execute a first routine consisting of blocks 402, 404, 406, and 416 to package an encoded content stream into an output stream. The content packager 104 may further execute a second routine consisting of blocks 408 through 414 at each time that a request to switch encoded content streams within the output stream is received. Thus, the ordering of operations within the routine 400 is intended to be illustrative in nature. Moreover, while a set of operations is shown within routine 400 for illustrative purposes, the routine 400 may be modified to include additional or alternative operations in accordance with the present embodiments. As one example, an additional block may be inserted prior to or after block 410, wherein the content packager 104 modifies the encoded content streams that it is receiving from encoders. Illustratively, on receiving a request to switch from packaging a first encoded content stream to a second encoded content stream, the content packager 104 may initiate reception of the second encoded content stream (e.g., by accessing a resource locator corresponding to the second encoded content stream). Similarly, after switching an output content stream to the second encoded content stream, the content packager 104 may halt reception of the first encoded content stream. Accordingly, the set of operations is shown within routine 400 is intended to be illustrative in nature.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for altering encoded content streams, the system comprising:
 a first encoder computing device configured to receive a first input content stream and encode the first input content stream into a first encoded content stream;
 a second encoder computing device configured to receive a second input content stream and encode the second input content stream into a second encoded content stream;
 a content packager computing device configured to obtain the first encoded content stream, package the first encoded content stream into an output stream, and transmit the output stream to a receiving device; and
 an output switch controller computing device configured to:
  receive a request to replace, at a specified location within the output stream, the first encoded content stream with the second encoded content stream, wherein the request specifies the specified location within the output stream;
  transmit instructions to the first and second encoder computing devices to insert aligned splice point frames into the respective first and second encoded content streams at locations in the respective encoded content streams corresponding to the specified location within the output stream, wherein the aligned splice point frames ensure that, at the respective locations corresponding to the specified location within the output stream, no inter frame dependency exists between frames of the respective encoded content streams prior and subsequent to the splice point frames, and wherein the instructions indicate the locations in the respective encoded content streams corresponding to the specified location within the output stream; and
  transmit instructions to the content packager computing device to replace, in the output stream, the first encoded content stream with the second encoded content stream at the specified location within the output stream;
 wherein the content packager is configured to respond to the instructions by replacing, in the output stream, the first encoded content stream with the second encoded content stream at the specified location within the output stream.

2. The system of claim 1, wherein the first encoded content stream is live streaming content.

3. The system of claim 1, wherein the first and second encoders each include an interface through which to receive the content, and wherein the interface is at least one of an serial digital interface (SDI) or a network interface.

4. The system of claim 1, wherein the first and second encoded content streams are encoded according to the H.264 standard, and wherein the splice point frames are Instantaneous Decoder Refresh ("IDR") frames.

5. The system of claim 1, wherein the first encoder computing device is further configured to transmit state information to the second encoder computing device, the state information indicating timestamp values included within the first encoded content stream, and wherein the second encoder computing device is further configured to modify timestamp values in the second encoded content stream to match the timestamp values included within the first encoded content stream.

6. A computer-implemented method comprising:
 obtaining a first encoded content stream;
 packaging the first encoded content stream into an output stream;
 receiving a request to replace the first encoded content stream in the output stream with a second encoded content stream, wherein the request specifies a location of the output stream at which packaging of the second encoded content stream should begin;
 transmitting, to encoder computing devices encoding the respective first and second encoded content streams, an instruction to insert into the respective first and second encoded content streams aligned splice point frames at locations in the respective encoded content streams corresponding to the specified location within the output stream, aligned splice point frames ensure that, at the respective locations corresponding to the specified location within the output stream, no inter frame dependency exists between frames of the respective encoded content streams prior and subsequent to the splice point frames, and wherein the instructions indicate the locations in the respective encoded content streams corresponding to the specified location within the output stream;

obtaining the second content stream from at least the location in the second encoded content stream corresponding to the specified location within the output stream; and halting packaging of the first encoded content stream into the output stream and beginning packaging of the second encoded content stream into the output stream.

7. The computer-implemented method of claim 6, wherein the location of the output stream is indicated by a time value corresponding to at least one of a timestamp value, a time code value, or a local real time value.

8. The computer-implemented method of claim 6 further comprising detecting the specified location within the output stream by at least one of detecting time values within the respective first and second encoded content streams or detecting the splice point frames within the respective first and second encoded content streams.

9. The computer-implemented method of claim 6, wherein the output stream is packaged within a container corresponding to at least one of a Matroska, FLV, Motion JPEG, MPEG-4 Part 12, VOB, Ogg, Audio Video Interleave ("AVI"), Quicktime, Advanced Systems Format ("ASF"), MPEG-Transport Stream ("MPEG-TS"), or RealMedia container.

10. The computer-implemented method of claim 6, wherein the output stream is packaged within a plurality of containers generated in accordance with at least one of the Hypertext Transport Protocol ("HTTP") Live Streaming ("HLS") protocol or MPEG Dynamic Adaptive Streaming over HTTP ("MPEG-DASH") protocol.

11. The computer-implemented method of claim 6, wherein the instruction to insert the splice point frames into the first encoded content stream is transmitted to the first encoder computing device via at least one of transmission of a request to an application programming interface of the first encoder computing device, insertion of a SCTE-35 message into an input content stream corresponding to the first encoded content stream, or insertion of a SCTE-104 message into the input content stream.

12. The computer-implemented method of claim 6, wherein the first and second encoded content streams are Moving Picture Experts Group Transport Streams ("MPEG-TSs").

13. The computer-implemented method of claim 6 further comprising halting reception of the first encoded content stream subsequent to the specified location in the output stream.

14. A system comprising:

at least one memory including computer-executable instructions; and at least one processor to execute the computer-executable instructions, wherein execution of the computer-executable instructions causes the system to:

obtain a first encoded content stream;

package the first encoded content stream into an output stream;

receive a request to replace the first encoded content stream in the output stream with a second encoded content stream, wherein the request specifies a location of the output stream at which packaging of the second encoded content stream should begin;

transmit, to encoder computing devices encoding the respective first and second encoded content streams, an instruction to insert into the respective first and second encoded content streams, at locations in the respective encoded content streams corresponding to the specified location within the output stream, aligned frames that ensure that, at the respective locations corresponding to the specified location within the output stream, no inter frame dependency exists between frames of the respective encoded content streams prior and subsequent to the inserted frames, and wherein the instructions indicate the locations in the respective encoded content streams corresponding to the specified location within the output stream;

obtain the second content stream from at least the location in the second encoded content stream corresponding to the specified location within the output stream; and halt packaging of the first encoded content stream into the output stream and begin packaging of the second encoded content stream into the output stream.

15. The system of claim 14, wherein a first encoder computing device of the encoder computing devices is configured to transmit state information to a second encoder computing device of the encoder computing devices, the state information indicating timestamp values included within the first encoded content stream, and wherein the second encoder computing device is configured to modify timestamp values in the second encoded content stream to match the timestamp values included within the first encoded content stream.

16. The system of claim 14, wherein the instruction to insert the frame into the first encoded content stream is transmitted to the encoder computing device encoding the first encoded content stream via at least one of transmission of a request to an application programming interface of the encoder computing device, insertion of a SCTE-35 message into an input content stream corresponding to the first encoded content stream, or insertion of a SCTE-104 message into the input content stream.

17. The system of claim 14, wherein execution of the computer-executable instructions further causes the processor to detect the specified location within the output stream by at least one of detecting time values within the respective first and second encoded content streams or detecting the inserted frames within the respective first and second encoded content streams.

18. The system of claim 14, wherein execution of the computer-executable instructions causes the processor to halt packaging of the first encoded content stream into the output stream and begin packaging of the second encoded content stream into the output stream without decoding either the first or second encoded content stream.

19. The system of claim 14, wherein execution of the computer-executable instructions further causes the processor to halt reception of the first encoded content stream subsequent to the specified location in the output stream.

20. The system of claim 14, wherein execution of the computer-executable instructions further causes the processor to obtain the second content stream in response to the request.

21. The system of claim 14, wherein execution of the computer-executable instructions further causes the processor to:

receive a request to replace the second encoded content stream in the output stream with a third encoded content stream, wherein the request specifies a location of the output stream at which packaging of the third encoded content stream should begin;

determine that a splice point frame, ensuring no inter frame dependency exists between frames prior and subsequent to the splice point frame, will occur at a common location within both the second encoded content stream and the third encoded content stream within a threshold distance of the location specified within the request; and at a point in the output stream corresponding to the common location, halt packaging of the second encoded content stream into the output stream and begin packaging of the third encoded content stream into the output stream.

\* \* \* \* \*